(12) United States Patent
Wilger et al.

(10) Patent No.: US 10,845,228 B2
(45) Date of Patent: Nov. 24, 2020

(54) LIQUID FLOW SENSOR WITH ADJUSTABLE OPERATIONAL RANGE

(71) Applicant: Wilger Industries Ltd., Saskatoon (CA)

(72) Inventors: Wilfred H. Wilger, Saskatoon (CA); Sean Georget, Saskatoon (CA)

(73) Assignee: Wilger Industries, Ltd., Saskatoon (CA)

( * ) Notice: Subject to any disclaimer, the term of this patent is extended or adjusted under 35 U.S.C. 154(b) by 0 days.

(21) Appl. No.: 16/470,543

(22) PCT Filed: Oct. 27, 2017

(86) PCT No.: PCT/CA2017/051281
§ 371 (c)(1),
(2) Date: Jun. 17, 2019

(87) PCT Pub. No.: WO2018/107269
PCT Pub. Date: Jun. 21, 2018

(65) Prior Publication Data
US 2019/0339103 A1    Nov. 7, 2019

(30) Foreign Application Priority Data
Dec. 15, 2016  (CA) ........................ 2951789

(51) Int. Cl.
  *G01F 1/34*  (2006.01)
  *G01F 3/06*  (2006.01)
  *G01F 1/08*  (2006.01)
(52) U.S. Cl.
  CPC ............... *G01F 3/06* (2013.01); *G01F 1/08* (2013.01); *G01F 1/34* (2013.01)

(58) Field of Classification Search
  CPC ...................................................... G01F 1/34
  See application file for complete search history.

(56) References Cited

U.S. PATENT DOCUMENTS 2,949,764 A    8/1960  Knauth
3,550,426 A *  12/1970 Griffo ................. G01F 25/0007
                                                          73/1.35
(Continued)

FOREIGN PATENT DOCUMENTS

CN        204788511 U    11/2015
WO    WO 2009/127952    10/2009

OTHER PUBLICATIONS

International Search Report and Written Opinion for Application No. PCT/CA2017/051281, filed Oct. 27, 2017 (7 pgs.).
(Continued)

*Primary Examiner* — Jewel V Dowtin
(74) *Attorney, Agent, or Firm* — Patterson Thuente Pedersen, P.A.

(57) ABSTRACT

A flow meter has a meter wheel housing connectable in-line in a liquid conduit such that liquid flows through the meter wheel housing from an input port to an output port. Liquid flowing from the input port to the output port rotates a meter wheel mounted in the housing, and a wheel sensor measures rotational speed of the meter wheel. A first jet member defining a first orifice with a first cross-sectional area is movable into a jet operating position between the upstream end of the liquid conduit and the input port such that liquid passes through the input port into the meter wheel housing only through the first orifice. A second jet member defining a second orifice with a second cross-sectional area is movable into the jet operating position. The second cross-sectional area is less than the first cross-sectional area.

12 Claims, 3 Drawing Sheets

(56) References Cited

U.S. PATENT DOCUMENTS

| | | | | |
|---|---|---|---|---|
| 3,990,305 A | * | 11/1976 | Wallman | G01F 1/115 |
| | | | | 73/861.02 |
| 4,467,660 A | | 8/1984 | McMillan | |
| 7,426,875 B1 | * | 9/2008 | McMillan | G01F 1/065 |
| | | | | 73/861.79 |
| 7,607,362 B1 | * | 10/2009 | Brost | G01F 1/06 |
| | | | | 73/202 |
| 8,191,795 B2 | | 6/2012 | Grimm et al. | |
| 9,310,233 B2 | | 4/2016 | Schmidt | |

OTHER PUBLICATIONS

Extended European Search Report from EP Application No. 17881946, dated Feb. 20, 2020, 9 pgs.

* cited by examiner

LIQUID FLOW SENSOR WITH ADJUSTABLE OPERATIONAL RANGE

RELATED APPLICATION

This application is a national phase application under 35 U.S.C. § 371 of International Application No. PCT/CA2017/051281 filed on Oct. 27, 2017 which claims the benefit of Canadian Patent Application No 2951789 filed on Dec. 15, 2016, the contents of both of which are incorporated herein by reference in their entirety.

This disclosure relates to the field of liquid material handling and in particular a flow sensor for determining liquid flow rates over a wide range.

BACKGROUND

Sensing and measuring the flow of liquid through various conduits is required in many industries. For example in agricultural operations herbicides, pesticides, fungicides, fertilizers, and the like are commonly sprayed in liquid form on fields or plants. Such operations are described for example in U.S. Pat. No. 9,310,233 to Schmidt and U.S. Pat. No. 8,191,795 Grimm et al., which also describe systems for determining and controlling the rates of liquid application.

The rates of flow in such liquid application operations can vary significantly depending on the particular operation, and on where the flow rate is measured. A common type of flow meter comprises a meter wheel rotatably mounted in a meter wheel housing with input and output ports. The meter wheel housing is connected in-line in a liquid conduit such that the liquid flowing in the liquid conduit flows into the meter wheel housing through the input port and out of the meter wheel housing through the output port, such that the liquid passing through the meter wheel housing rotates the wheel. A wheel sensor measures the rotational speed of the wheel and the flow rate is calculated from the rotational speed.

Such rotating meter wheel flow sensors are simple and economical. A problem with these types of flow meters, however, is that they are accurate only within a range of a factor of about ten, in that they accurately measure flows from a minimum flow rate to a maximum flow rate that is about ten times the minimum flow rate. In some operations flow rates through a liquid conduit can vary by a factor of fifty, such that the a maximum flow rate is about fifty times the minimum flow rate.

SUMMARY OF THE INVENTION

The present disclosure provides a liquid flow meter apparatus that overcomes problems in the prior art.

In a first embodiment the present disclosure provides a flow meter apparatus for measuring a rate of liquid flow in a liquid conduit. The apparatus comprises a meter wheel housing adapted at an input port thereof for connection to an upstream end of the liquid conduit and adapted at an output port thereof for connection to a downstream end of the liquid conduit such that when connected, liquid flowing in the liquid conduit flows through the meter wheel housing from the input port to the output port. A meter wheel is rotatably mounted in the meter wheel housing about a wheel axis and configured such that liquid flowing from the input port to the output port causes the meter wheel to rotate, and a wheel sensor is operative to measure a rotational speed of the meter wheel. A first jet member defining a first orifice with a first cross-sectional area is configured to be moved into a jet operating position between the upstream end of the liquid conduit and the input port such that liquid passes through the input port into the meter wheel housing only through the first orifice. A second jet member defining a second orifice with a second cross-sectional area is configured to be moved into the jet operating position such that liquid passes through the input port into the meter wheel housing only through the second orifice. The second cross-sectional area is less than the first cross-sectional area.

In a second embodiment the present disclosure provides a method of measuring a rate of liquid flow through a liquid conduit. The method comprises connecting a meter wheel housing at input and output ports thereof in-line with the liquid conduit such that liquid flowing through the liquid conduit flows into the input port of the meter wheel housing and out of the output port of the meter wheel housing; rotatably mounting a meter wheel in the meter wheel housing about a wheel axis such that liquid flowing from the input port to the output port causes the meter wheel to rotate; providing a first jet member defining a first orifice with a first cross-sectional area and moving the first jet member into a jet operating position between the upstream end of the liquid conduit and the input port such that liquid passes through the input port into the meter wheel housing only through the first orifice; passing liquid through the liquid conduit and meter wheel housing at a liquid flow rate that is in a first flow rate range between a minimum first flow rate and a maximum first flow rate, and measuring a rotational speed of the meter wheel to determine first flow rates in the first flow rate range; providing a second jet member defining a second orifice with a second cross-sectional area and moving the first jet member out of the jet operating position and moving the second jet member into the jet operating position such that liquid passes through the input port into the meter wheel housing only through the second orifice; passing liquid through the liquid conduit and meter wheel housing at a liquid flow rate that is in a second flow rate range between a minimum second flow rate and a maximum second flow rate, and measuring the rotational speed of the meter wheel to determine second flow rates in the second flow rate range; wherein the minimum first flow rate is greater than the minimum second flow rate and the maximum first flow rate is greater than the maximum second flow rate.

The present disclosure provides a flow meter apparatus that uses a meter wheel rotated by the flowing liquid to measure the flow rate and that can accommodate a wide range of flows. In flow meters using a meter wheel, proper operation requires that the liquid contacting the wheel be travelling at a sufficient speed to turn the wheel at a sufficient speed to record accurately. In the present disclosure as the required flow rate, being the flow rate through the liquid conduit, reduces, the size of the orifice that the liquid flows through into the meter wheel housing is correspondingly reduced to thereby increase the speed of the liquid flowing therethrough to maintain the flow rate. By reducing the orifice size for lower flow rates a strong and consistent jet can be maintained against the wheel to record accurately. Each jet insert will accommodate a range of flow rates, and when the flow rate changes such that same is outside the range, then a different jet insert with a different sized orifice is inserted in the input port.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
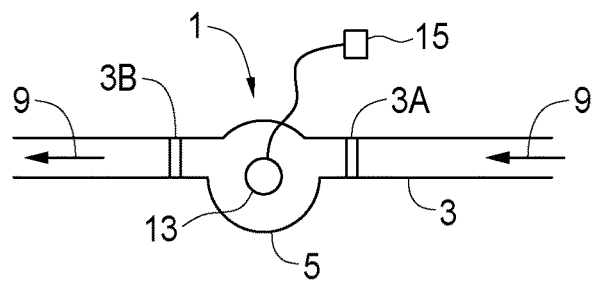
FIG. 1 is a schematic side view of an embodiment of the flow meter apparatus of the present disclosure connected in-line with a liquid conduit.
Figure 2:
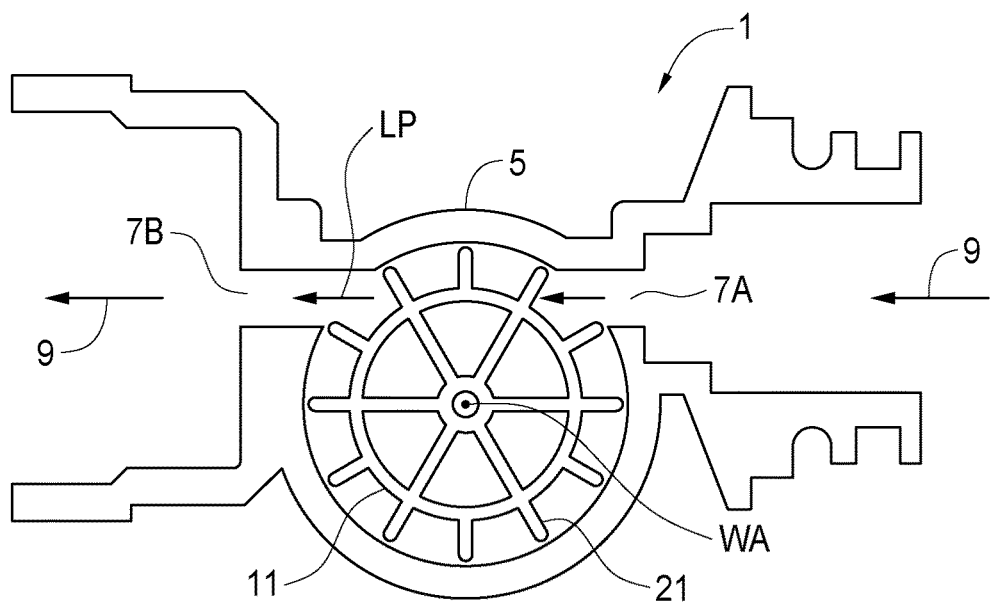
FIG. 2 is a sectional side view of the embodiment of FIG. 1 with the input port of the meter wheel housing open.

FIGS. 1-4 schematically illustrates an embodiment of a flow meter apparatus 1 of the present disclosure for measuring a rate of liquid flow in a liquid conduit 3. The apparatus 1 comprises a meter wheel housing 5 adapted at input 7A thereof for connection to an upstream end 3A of the liquid conduit 3 and adapted at an output port 7B thereof for connection to a downstream end 3B of the liquid conduit 3 such that when connected, liquid flowing in the liquid conduit 3 flows through the meter wheel housing 5 from the input port 7A to the output port 7B.

The apparatus 1 is shown with a particular configuration of releasable fittings adjacent to the input and output ports 7A, 7B which fittings will be selected to suit connection to the particular liquid conduit 3.

A meter wheel 11 is rotatably mounted in the meter wheel housing 5 about a wheel axis WA and is configured such that liquid 9 flowing from the input port 7A to the output port 7B causes the meter wheel 11 to rotate. A wheel sensor 13, such as a Hall effect sensor or the like, is operative to measure the rotational speed of the meter wheel 11 and is typically connected to a microprocessor 15 which will convert the rotational speed to a flow rate, and use the information for various purposes as is known in the art.

In order to obtain a reasonably accurate flow rate the stream of liquid contacting the wheel must be travelling at a sufficient speed to turn the wheel at a sufficient speed to get an accurate reading. It can be seen that the cross-sectional area of the substantially circular input port 7A is significantly less than the cross-sectional area of the liquid conduit 3 so that the liquid 9 passing through the meter wheel housing 5 must move faster than the liquid 9 moving through the liquid conduit 3. The apparatus 1 thus induces some back pressure in the liquid conduit 3.

Figure 3:
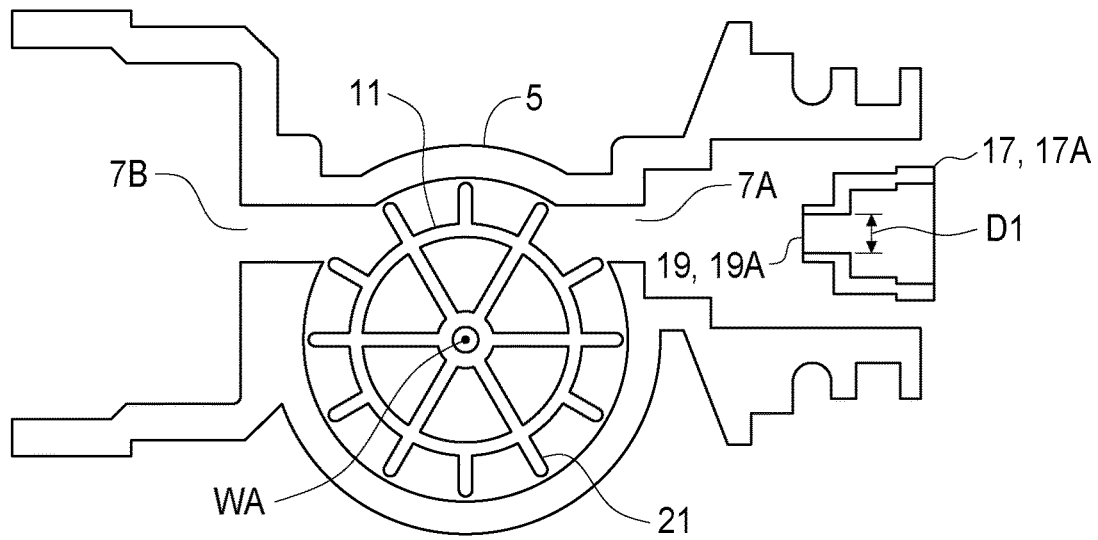
FIG. 3 is a sectional side view of the embodiment of FIG. 1 with a first jet insert adjacent to the input port of the meter wheel housing ready for insertion into the input port.
Figure 4:
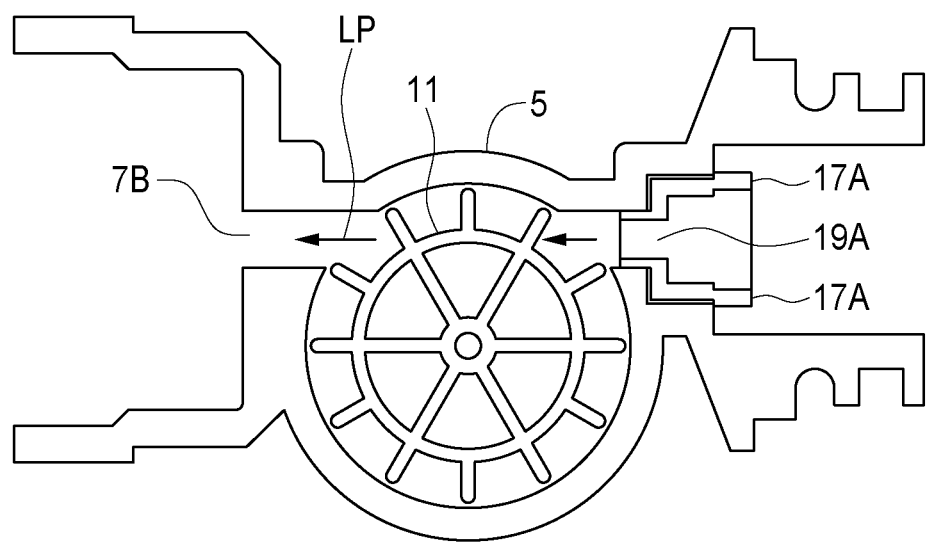
FIG. 4 is a sectional side view of the embodiment of FIG. 1 with the first jet insert of FIG. 3 in the jet operating position inserted into the input port of the meter wheel housing.

In FIG. 1 it can be seen that the input and output ports 7A, 7B are about the same size. In order to produce a strong steady jet stream of liquid to turn the meter wheel 11 at a sufficient speed to provide a desirable accuracy of flow rate determination, in the present apparatus 1 a first jet member, here illustrated as a jet insert 17A, which defines a first orifice 19A with a first diameter D1 and corresponding first cross-sectional area, is moved into position adjacent to the input port 7A as shown in FIG. 3 and pushed into the input port 7A to a jet operating position illustrated in FIG. 4 where the jet insert 17A is between the upstream end 3A of the liquid conduit 3 and the input port 7A such that liquid 9 passes through the input port 7A into the meter wheel housing 5 only through the first orifice 19A.

With the first jet insert 17A in place when the liquid flow rate is in jet insert 17A a first flow rate range between a minimum first flow rate and a maximum first flow rate, the meter wheel 11 turns at a sufficient speed to provide the required accuracy of flow rate determination.

Figure 5:
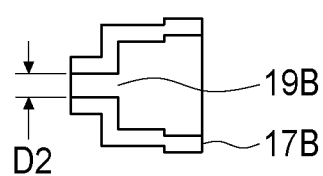
FIG. 5 is a schematic sectional view of a second jet insert for insertion into the input port of the meter wheel housing, where the cross-sectional area of the orifice in the second jet insert is less than the cross-sectional area of the orifice in the first jet insert

When flow rates are contemplated to be in a lower range of flow rates the first jet insert 17A is removed and a second jet insert 17B, which defines a second orifice 19B with a second diameter D2 and corresponding second cross-sectional area as illustrated in FIG. 5, is moved into the jet operating position in the input port. The second orifice 19B is smaller than the first orifice 19A such that the speed of the liquid flowing through the meter wheel housing 5 is increased compared to when the first jet insert 17A is in the jet operating position. The jet inserts 17 are configured to fit removably into the input port 7A such that liquid passes into the meter wheel housing 5 only through the orifices 19 in the jet inserts 17.

With the second jet insert 17B in place, the apparatus 1 is ready to measure flow rates of liquid passing through the liquid conduit 3 and meter wheel housing 5 that are in a second flow rate range between a minimum second flow rate and a maximum second flow rate. The minimum second flow rate is less than the minimum first flow rate and the maximum second flow rate is less than the maximum first flow rate.

Figure 6:
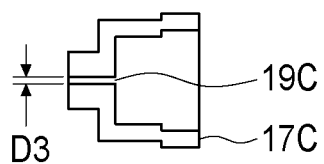
FIG. 6 is a schematic sectional view of a third jet insert for insertion into the input port of the meter wheel housing, where the cross-sectional area of the orifice in the third jet insert is less than the cross-sectional area of the orifice in the second jet insert.

To determine lower liquid flow rates, jet inserts 17 with orifices 19 of progressively reduced cross-sectional area can be inserted into the input port 7A. FIG. 6 for example illustrates a third jet insert 17C defining a third orifice 19C with a third diameter D3 and corresponding third cross-sectional area that is less than the second cross-sectional area of the second orifice 19B.

With the third jet insert in place the apparatus 1 is ready to measure flow rates of liquid passing through the liquid conduit 3 and meter wheel housing 5 that are in a third flow rate range between a minimum third flow rate and a maximum third flow rate. The minimum third flow rate is less than the minimum second flow rate and the maximum third flow rate is less than the maximum second flow rate.

The flow rate ranges will typically overlap to some extent, and can be configured to suit a contemplated application.

The input and output ports 7A, 7B are configured such that liquid 9 flowing along a liquid path LP from the input port 7A to the output port 7B contacts the meter wheel 11 at a radial location removed from the wheel axis WA. In the illustrated apparatus 1 the input and output ports 7A, 7B are aligned such that flow though the conduit 3 is straight however they may be oriented at an angle where, for example, it is desired to put a bend in the liquid conduit 3.

The meter wheel 11 comprises paddles 21 extending from the wheel axis WA into the liquid path LP. In the illustrated apparatus 1 the paddles 21 are straight and extend radially from the wheel axis WA into the liquid path LP however same can be curved or otherwise shaped to cause the meter wheel 11 to rotate as the liquid flows through the meter wheel housing 5.

Figure 7:
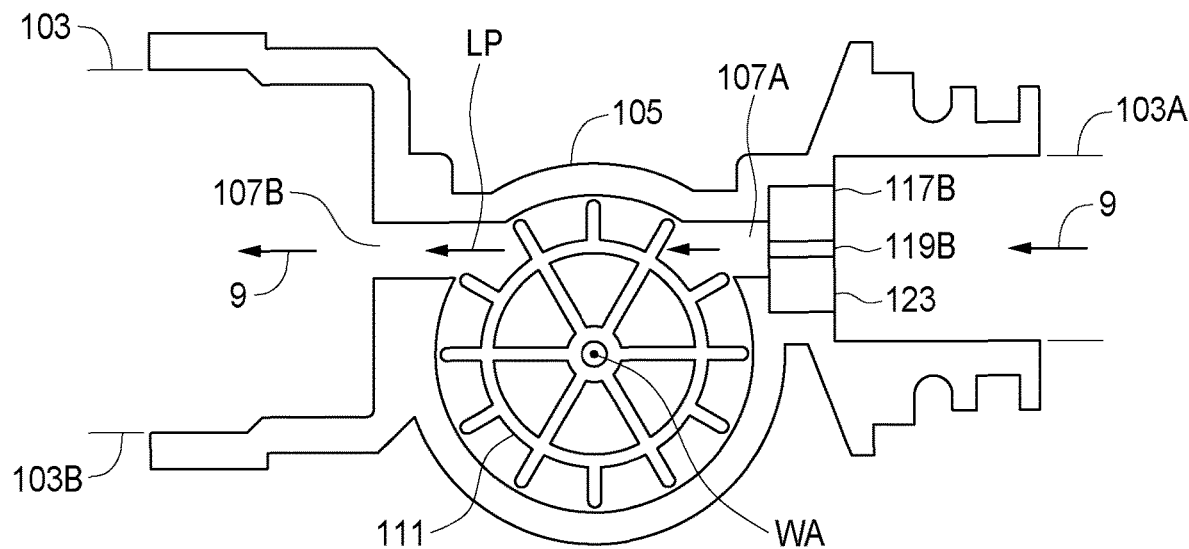
FIG. 7 is a schematic sectional side view of an alternate embodiment of the flow meter apparatus of the present disclosure connected in-line with a liquid conduit, where the jet members are mounted in a jet assembly.
Figure 8:
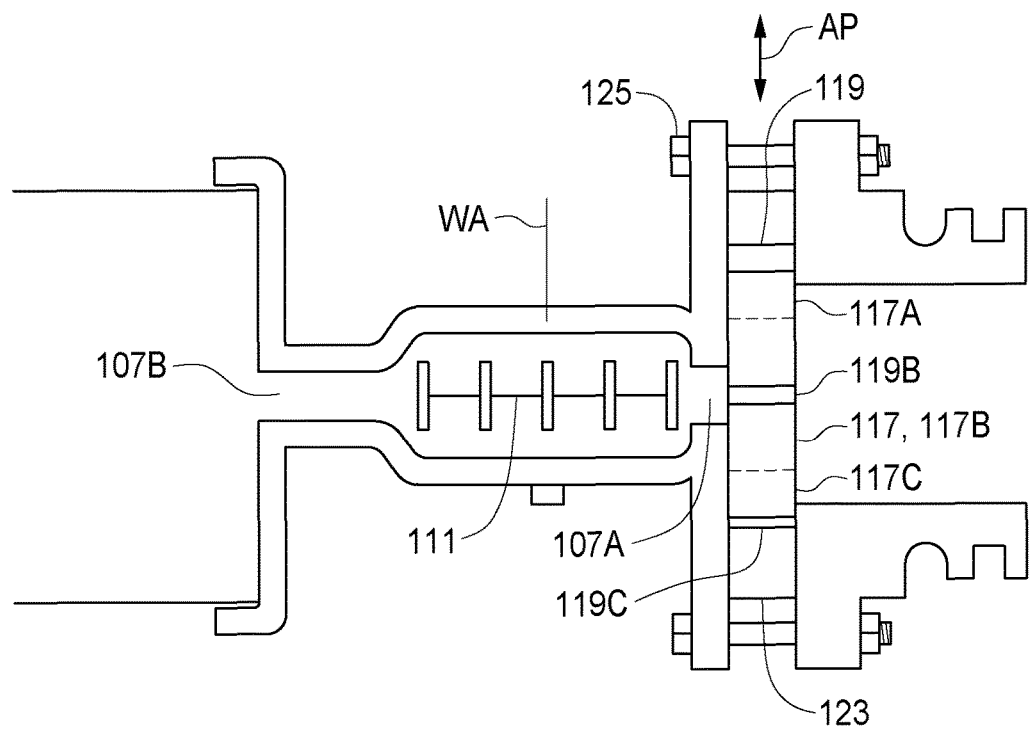
FIG. 8 is a schematic sectional top view of the embodiment of FIG. 7.

FIGS. 7 and 8 schematically illustrate an alternate embodiment of a flow meter apparatus 101 of the present disclosure for measuring a rate of liquid flow in a liquid conduit 103. The apparatus 101 comprises a meter wheel housing 105 adapted at input 107A thereof for connection to an upstream end 103A of the liquid conduit 103 and adapted at an output port 107B thereof for connection to a downstream end 103B of the liquid conduit 103 such that when connected, liquid flowing in the liquid conduit 103 flows through the meter wheel housing 105 from the input port 107A to the output port 107B.

A meter wheel 111 is rotatably mounted in the meter wheel housing 105 about a wheel axis WA and is configured such that liquid 9 flowing from the input port 107A to the output port 107B causes the meter wheel 111 to rotate as described above with respect to apparatus 1.

In the apparatus 101 three jet members 117A, 117B, 117C indicated by the dashed lines define corresponding orifices 119A, 119B, 119C and are mounted in a jet assembly 123 located between the upstream end 103A of the liquid conduit 103 and the input port 107A. The jet assembly 123 is slidable along path assembly path AP such that each jet member 117 can be moved into the jet operating position illustrated in FIG. 7 aligned with the input port 107A. Tightening bolts 125 and appropriate seals are provided to prevent leakage.

It is contemplated that the jet members 117 could also mounted in a revolving cylinder or like arrangement. The illustrated jet assembly 123 is mounted close to the input port 107A such that jets from the orifices 119 are close enough to contact the meter wheel 11 before dispersing.

The present disclosure also provides a method of measuring a rate of liquid flow through a liquid conduit 3. The method comprises connecting a meter wheel housing 5 at input and output ports 7A, 7B thereof in-line with the liquid conduit 3 such that liquid 9 flowing through the liquid conduit 3 flows into the input port 7A of the meter wheel housing 5 and out of the output port 7B of the meter wheel housing 5; rotatably mounting a meter wheel 11 in the meter wheel housing 5 about a wheel axis WA such that liquid 9 flowing from the input port 7A to the output port 7B causes the meter wheel 11 to rotate; providing a first jet member 17A defining a first orifice 19A with a first cross-sectional area and moving the first jet member 17A into a jet operating position between the upstream end 3A of the liquid conduit 3 and the input port 7A such that liquid 9 passes through the input port 7A into the meter wheel housing 5 only through the first orifice 19A; passing liquid through the liquid conduit 3 and meter wheel housing 5 at a liquid flow rate that is in a first flow rate range between a minimum first flow rate and a maximum first flow rate, and measuring a rotational speed of the meter wheel 11 to determine first flow rates in the first flow rate range; providing a second jet member 17B defining a second orifice 19B with a second cross-sectional area and moving the first jet member 17A out of the jet operating position and moving the second jet member 17B into the jet operating position such that liquid passes through the input port 7A into the meter wheel housing 5 only through the second orifice 19B; passing liquid through the liquid conduit 3 and meter wheel housing 5 at a liquid flow rate that is in a second flow rate range between a minimum second flow rate and a maximum second flow rate, and measuring the rotational speed of the meter wheel 11 to determine second flow rates in the second flow rate range; wherein the minimum first flow rate is greater than the minimum second flow rate and the maximum first flow rate is greater than the maximum second flow rate.

The method may further comprise providing a third jet member 17C defining a third orifice 19C with a third cross-sectional area that is less than the second cross-sectional area and moving the second jet member 17B out of the jet operating position and moving the third jet member 17C into the jet operating position such that liquid passes through the input port 7A into the meter wheel housing 5 only through the third orifice 19C and passing liquid through the liquid conduit 3 and meter wheel housing 5 at a liquid flow rate that is in a third flow rate range between a minimum third flow rate and a maximum third flow rate, and measuring the rotational speed of the meter wheel 11 to determine third flow rates in the third flow rate range where the minimum second flow rate is greater than the minimum third flow rate and the maximum second flow rate is greater than the maximum third flow rate.

When using the apparatus 1 it will be necessary to stop the flow of liquid through the liquid conduit 3 and disconnect the upstream end 3A of the liquid conduit 3 from the input port 7A to move the jet members 17 in and out of the jet operating position. When using the alternate apparatus 101 it is possible to move the jet members 117 into and out of the jet operating position without disconnecting the upstream end 3A of the liquid conduit 3 from the input port 7A.

The present disclosure provides a flow meter apparatus 1 that uses a meter wheel 11 rotated by flowing liquid 9 to measure the liquid flow rate in a liquid conduit 3 and that can accommodate a wide range of flows. In flow meters using a meter wheel, proper operation requires that the liquid 9 contacting the wheel 11 be travelling at a sufficient speed to turn the wheel 11 at a sufficient speed to record accurately. In the present disclosure as the flow rate reduces, the size of the orifice 19 that the liquid 9 flows through into the meter wheel housing 5 is reduced such that the speed of the liquid 9 flowing therethrough must increase to maintain the flow rate. By reducing the orifice size for lower flow rates a strong and consistent jet can be maintained against the wheel 11 to record accurately. Each jet member 17 will accommodate a range of flow rates, and when the flow rate changes such that same is outside the range, then a different jet member 17 is moved into the jet operating position.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A flow meter apparatus for measuring a rate of liquid flow in a liquid conduit, the apparatus comprising:
   a meter wheel housing adapted at an input port thereof for connection to an upstream end of the liquid conduit and adapted at an output port thereof for connection to a downstream end of the liquid conduit such that when connected, liquid flowing in the liquid conduit flows through the meter wheel housing from the input port to the output port;

a meter wheel rotatably mounted in the meter wheel housing about a wheel axis and configured such that liquid flowing from the input port to the output port causes the meter wheel to rotate;

a wheel sensor operative to measure a rotational speed of the meter wheel;

a first jet member defining a first orifice with a first cross-sectional area and configured to be moved into a jet operating position between the upstream end of the liquid conduit and the input port such that liquid passes through the input port into the meter wheel housing only through the first orifice;

a second jet member defining a second orifice with a second cross-sectional area and configured to be moved into the jet operating position such that liquid passes through the input port into the meter wheel housing only through the second orifice;

wherein the second cross-sectional area is less than the first cross-sectional area.

2. The apparatus of claim 1 wherein the input and output ports are configured such that liquid flowing along a liquid path from the input port to the output port contacts the meter wheel at a radial location removed from the wheel axis.

3. The apparatus of claim 2 wherein the meter wheel comprises paddles extending from the wheel axis into the liquid path.

4. The apparatus of claim 1 further comprising a third jet member defining a third orifice with a third cross-sectional area and configured to be moved into the jet operating position such that liquid passes through the input port into the meter wheel housing only through the third orifice, and wherein the third cross-sectional area is less than the second cross-sectional area.

5. The apparatus of claim 1 wherein the meter wheel housing is adapted at the input port thereof for releasable connection to the upstream end of the liquid conduit, and wherein the jet members are provided by jet inserts configured to be removably inserted into the input port.

6. The apparatus of claim 1 wherein the jet members are mounted in a jet assembly located between the upstream end of the liquid conduit and the input port, and wherein the jet assembly is configured such that each jet member can be moved into the jet operating position.

7. A method of measuring a rate of liquid flow through a liquid conduit, the method comprising:

connecting a meter wheel housing at input and output ports thereof in-line with the liquid conduit such that liquid flowing through the liquid conduit flows into the input port of the meter wheel housing and out of the output port of the meter wheel housing;

rotatably mounting a meter wheel in the meter wheel housing about a wheel axis such that liquid flowing from the input port to the output port causes the meter wheel to rotate;

providing a first jet member defining a first orifice with a first cross-sectional area and moving the first jet member into a jet operating position between the upstream end of the liquid conduit and the input port such that liquid passes through the input port into the meter wheel housing only through the first orifice;

passing liquid through the liquid conduit and meter wheel housing at a liquid flow rate that is in a first flow rate range between a minimum first flow rate and a maximum first flow rate, and measuring a rotational speed of the meter wheel to determine first flow rates in the first flow rate range;

providing a second jet member defining a second orifice with a second cross-sectional area and moving the first jet member out of the jet operating position and moving the second jet member into the jet operating position such that liquid passes through the input port into the meter wheel housing only through the second orifice;

passing liquid through the liquid conduit and meter wheel housing at a liquid flow rate that is in a second flow rate range between a minimum second flow rate and a maximum second flow rate, and measuring the rotational speed of the meter wheel to determine second flow rates in the second flow rate range;

wherein the minimum first flow rate is greater than the minimum second flow rate and the maximum first flow rate is greater than the maximum second flow rate.

8. The method of claim 7 comprising:

providing a third jet member defining a third orifice with a third cross-sectional area that is less than the second cross-sectional area and moving the second jet member out of the jet operating position and moving the third jet member into the jet operating position such that liquid passes through the input port into the meter wheel housing only through the third orifice;

passing liquid through the liquid conduit and meter wheel housing at a liquid flow rate that is in a third flow rate range between a minimum third flow rate and a maximum third flow rate, and measuring the rotational speed of the meter wheel to determine third flow rates in the third flow rate range;

wherein the minimum second flow rate is greater than the minimum third flow rate and the maximum second flow rate is greater than the maximum third flow rate.

9. The method of claim 7 wherein liquid flowing along a liquid path from the input port to the output port contacts the meter wheel at a radial location removed from the wheel axis.

10. The method of claim 9 wherein the meter wheel comprises paddles extending from the wheel axis into the liquid path.

11. The method of claim 7 wherein the jet members are provided by jet inserts, and wherein the jet inserts are moved to the jet operating position by stopping liquid flow through the liquid conduit, disconnecting the input port from the liquid conduit and inserting a selected jet insert into the input port.

12. The method of claim 7 comprising mounting the jet members in a jet assembly and connecting the jet assembly between the upstream end of the liquid conduit and the input port, and manipulating the jet assembly to move a selected jet member into the jet operating position.

* * * * *